United States Patent
Yost

(10) Patent No.: US 10,883,831 B2
(45) Date of Patent: Jan. 5, 2021

(54) PERFORMANCE OF INERTIAL SENSING SYSTEMS USING DYNAMIC STABILITY COMPENSATION

(71) Applicant: Yost Labs Inc., Portsmouth, OH (US)

(72) Inventor: Paul Yost, Portsmouth, OH (US)

(73) Assignee: Yost Labs Inc., Portsmouth, OH (US)

(*) Notice: Subject to any disclaimer, the term of this patent is extended or adjusted under 35 U.S.C. 154(b) by 575 days.

(21) Appl. No.: 15/795,643

(22) Filed: Oct. 27, 2017

(65) Prior Publication Data

US 2018/0120112 A1 May 3, 2018

Related U.S. Application Data

(60) Provisional application No. 62/414,349, filed on Oct. 28, 2016.

(51) Int. Cl.
*G01C 21/18* (2006.01)
*G01S 19/47* (2010.01)
*G01C 21/16* (2006.01)

(52) U.S. Cl.
CPC .......... *G01C 21/18* (2013.01); *G01C 21/165* (2013.01); *G01S 19/47* (2013.01)

(58) Field of Classification Search
None
See application file for complete search history.

(56) References Cited

U.S. PATENT DOCUMENTS

| | | | |
|---|---|---|---|
| 8,275,544 B1* | 9/2012 | Wells | F41G 3/06 701/501 |
| 8,498,827 B2 | 7/2013 | Yost | |
| 8,682,610 B2 | 3/2014 | Landers et al. | |
| 8,768,647 B1* | 7/2014 | Zaki | G01C 21/16 702/150 |
| 9,255,799 B2 | 2/2016 | Landers et al. | |
| 9,354,058 B2 | 5/2016 | Yost | |
| 9,528,863 B2 | 12/2016 | Yost et al. | |
| 9,785,254 B2* | 10/2017 | Kulik | G06F 3/0304 |
| 10,209,078 B2 | 2/2019 | Yost | |
| 10,310,129 B2 | 6/2019 | Landers et al. | |
| 10,705,173 B2 | 7/2020 | Yost | |
| 2005/0240347 A1* | 10/2005 | Yang | G01C 21/16 701/500 |

(Continued)

OTHER PUBLICATIONS

Valenti, Keeping a Good Attitude: A Quaternion-Based Orientation Filter for IMUs and MARGs, Jun. 24, 2015, mdpi.com (Year: 2015).*

*Primary Examiner* — Nicholas K Wiltey
(74) *Attorney, Agent, or Firm* — Edell, Shapiro & Finnan, LLC

(57) ABSTRACT

A system is provided for improving performance of inertial sensing systems. The system uses dynamic stability compensation to adapt to the changing state of the inertial system such that the system remains ultra-responsive during dynamic events, while also exhibiting ultra stable output during subtle motions or rest conditions. The system uses a method that operates upon output data as it exits the component sensors but before it enters the sensor fusion that produces a final orientation. The method can be used with any sensor fusion algorithm to provide improved noise and stability performance in the output while having little to no impact upon responsiveness of that output during dynamic conditions.

18 Claims, 2 Drawing Sheets

(56) References Cited

U.S. PATENT DOCUMENTS

| | | | |
|---|---|---|---|
| 2009/0184849 A1* | 7/2009 | Nasiri | G06F 3/017 341/20 |
| 2009/0248301 A1* | 10/2009 | Judd | G01C 21/206 701/466 |
| 2011/0066395 A1* | 3/2011 | Judd | G01C 25/005 702/104 |
| 2011/0077889 A1* | 3/2011 | Vogt | G01C 17/38 702/93 |
| 2011/0310094 A1* | 12/2011 | Park | G06F 3/0488 345/419 |
| 2012/0130652 A1 | 5/2012 | Yost | |
| 2012/0158296 A1* | 6/2012 | Waters | G01C 19/04 701/509 |
| 2012/0166134 A1 | 6/2012 | Yost | |
| 2012/0197590 A1 | 8/2012 | Landers et al. | |
| 2012/0265470 A1 | 10/2012 | Yost et al. | |
| 2013/0106697 A1* | 5/2013 | Kulik | G01C 21/165 345/158 |
| 2013/0110450 A1* | 5/2013 | Kulik | G06F 3/0304 702/141 |
| 2013/0311129 A1 | 11/2013 | Yost | |
| 2013/0338955 A1 | 12/2013 | Landers et al. | |
| 2014/0232637 A1* | 8/2014 | Park | G06F 3/012 345/156 |
| 2014/0232648 A1* | 8/2014 | Park | G06F 3/0483 345/156 |
| 2015/0204994 A1 | 7/2015 | Landers et al. | |
| 2015/0241244 A1* | 8/2015 | Hsu | G01R 33/02 702/150 |
| 2017/0131094 A1* | 5/2017 | Kulik | G01C 21/165 |
| 2018/0058857 A1 | 3/2018 | Yost | |
| 2018/0059205 A1 | 3/2018 | Yost | |
| 2018/0372499 A1* | 12/2018 | Ali | G06N 20/00 |
| 2019/0346280 A1* | 11/2019 | Mutschler | G06K 9/00496 |
| 2019/0377345 A1* | 12/2019 | Bachrach | G06K 9/0063 |
| 2020/0027275 A1* | 1/2020 | Wan | G06T 17/05 |
| 2020/0073385 A1* | 3/2020 | Jobanputra | G06Q 10/00 |
| 2020/0094123 A1* | 3/2020 | Walshaw | G16H 40/67 |

\* cited by examiner ized Oct. 28, 2016, the disclosure of which is incorporated herein by reference in its entirety.

PERFORMANCE OF INERTIAL SENSING SYSTEMS USING DYNAMIC STABILITY COMPENSATION

This application claims priority to U.S. Provisional Application No. 62/414,349, entitled "IMPROVING PERFORMANCE OF INERTIAL SENSING SYSTEMS USING DYNAMIC STABILITY COMPENSATION" and filed Oct. 28, 2016, the disclosure of which is incorporated herein by reference in its entirety.

TECHNICAL FIELD

A present invention embodiment relates to using dynamic stability compensation to adapt to the changing state of an inertial system such that the system remains ultra-responsive during dynamic events while also exhibiting ultra-stable output during subtle motions or rest conditions.

BACKGROUND

Inertial sensor systems use multiple sensors of different types along with sensor fusion algorithms to compute output data. The sensor fusion algorithms rely upon sensors, such as gyroscopic sensors, acceleration sensors, and magnetometer sensors which are each sensitive to different sources and types of error. To lessen the extent of the errors, a sensor fusion process may be used. The sensor fusion process combines sensory data derived from disparate sources, such as those described above, so that the resulting output information has greater accuracy, less uncertainty, and less sensitivity to error sources than would be possible if the sensors were used individually.

Inertial sensor systems use the outputs of gyroscope sensors, acceleration sensors, and magnetometer sensors to create an integrated system that uses sensor fusion to produce a desired output that estimates the orientation (or attitude and heading) of the system. Such systems include 9 DOF Inertial Measurement Units (IMU), Attitude and Heading Reference Systems (AHRS), Compassing Systems, and Inertial Navigation Systems (INS). These systems use the outputs of the sensor elements as inputs to the sensor fusion and the sensor fusion uses this information to produce the orientation output.

For accurate results to be produced, it is beneficial for the sensors to produce signals that are both accurate and stable. The more accurate and more stable the sensor outputs are, the easier it is for the sensor fusion to produce an output that is both accurate and stable. Thus, an unstable sensor that exhibits noise in the sensor outputs can cause noise and instability in the sensor fusion orientation output. While sophisticated sensor fusion methods do exist that can partially mitigate noise and instability issues, the more noise and instability that is present in the sensor signal, the more difficult it is to produce a stable and noise-free output.

While methods exist for filtering the sensor data to reduce the noise and instability prior to sensor fusion to help mitigate the effects of the noise and instability, these methods have side-effects that are often negative. For instance, some of the methods used to filter sensor data include: over-sampling the sensor outputs, computing a running average of the sensor outputs, using a low-pass filter on the sensor outputs, and tuning the sensor fusion to reduce the response rate of the orientation to the changing sensor data. However, each of these methods suffer from the same disadvantages: While attempting to smooth the noise and instability in the data coming from the sensors, the data is adjusted to make the data more smooth or make the effect of the incoming data less instant. This, in turn, causes the orientation output to become less responsive, have a sluggish reaction to changes, lose subtle or quick changes in orientation or lag behind the real-world system that is being sensed. Thus, the system designer is faced with a trade-off—either have a system with stable low-noise output that exhibits poor responsiveness or have a system that exhibits good responsiveness characteristics but is unstable and exhibits high noise sensitivity.

SUMMARY

A present invention embodiment is directed to a system that dynamically adapts to a changing state of an inertial system such that the system remains ultra-responsive during dynamic events, while also exhibiting ultra stable output during subtle motions or rest conditions. An identified method operates upon output data as it exits the component sensors but before it enters the sensor fusion that produces a final orientation. The method can be used with any sensor fusion algorithm to provide improved noise and stability performance in the output while having little to no impact upon responsiveness of that output during dynamic conditions.

DETAILED DESCRIPTION OF AN EXAMPLE EMBODIMENT

Figure 1:
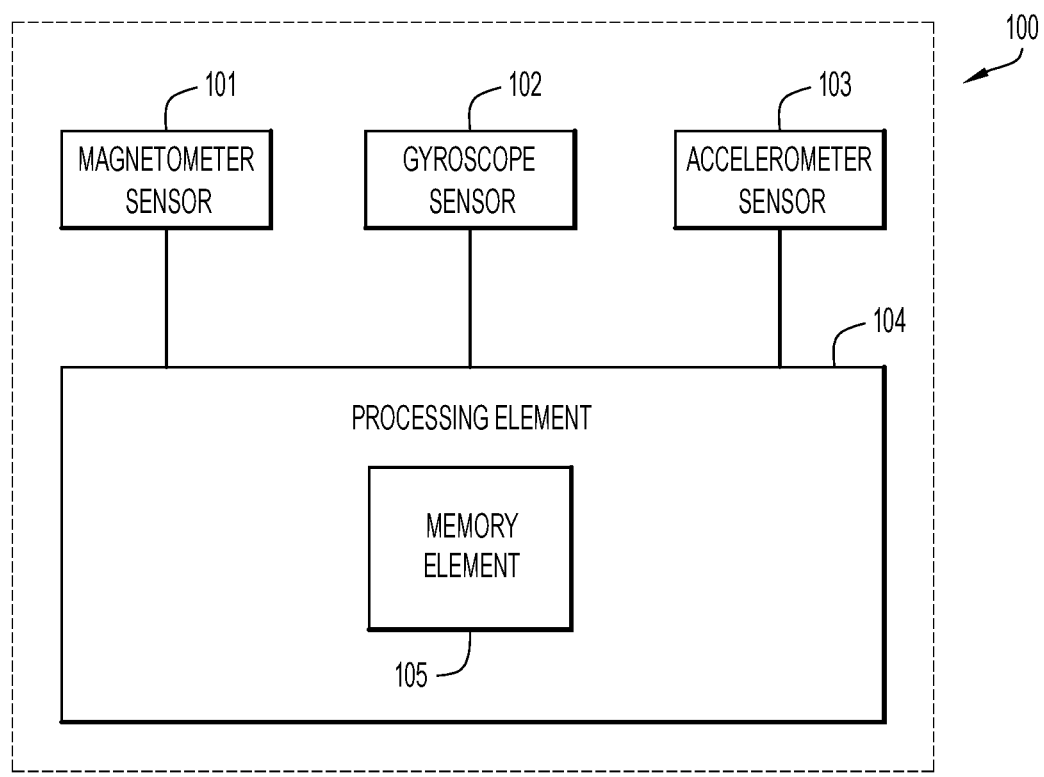
FIG. 1 is a block diagram of an inertial sensing system using dynamic stability compensation according to an embodiment of the present invention.

FIG. 1 is a block diagram of an embodiment of the present invention illustrating a system 100 that improves the performance of inertial sensing systems. The system employs multiple sensing elements and other components, such as a magnetometer sensor (magnetometer) 101, a rate gyroscope sensor (rate gyroscope) 102, an accelerometer sensor (accelerometer) 103, a processing element 104, and a memory element 105.

The magnetometer 101 of the present invention embodiment senses the magnitude and direction of Earth's magnetic field. The magnetometer may have a multitude of axes such that the output represents a vector that indicates the direction and magnitude of the sensed magnetic field in 3-space.

The rate gyroscope 102 of the present invention embodiment senses the rate of change of angle (angular velocity) over time. The rate gyroscope may have a multitude of axes such that the output represents the rates in change of the entire sensor body in 3-space. Thus, the output of the rate gyroscope is the derivative of the angular position over time. Using this output, the angular position can be computed by integrating the angular velocity over time. Since the sensing elements are not perfect and the output of the sensors is being integrated using a computed integral that is based upon the sum of a finite number of samples taken at discrete time intervals, the computed value will be imperfect. Thus, due to sensor element noise, measurement noise, and integral approximation, the results will contain error terms and, due to the process of integration, the error terms will tend to grow with time. This accumulated error over time is called drift.

The accelerometer 103 of the present invention embodiment senses acceleration forces applied to the sensor body. The sensed acceleration forces are the sum of the static forces, such as the constant force of gravity acting on the sensor, and the dynamic forces, such as those caused by moving or vibrating the sensor body. The accelerometer may have a multitude of axes such that the output represents a vector that indicates the direction and magnitude of the sensed acceleration forces in 3-space. The accelerometer vector may be used to aid in providing a vector that can be used as a reference to remove or limit gyroscope drift.

The processing element 104 of the present invention embodiment is an element (e.g., processor, controller, etc.) configured to process the sensor readings and apply the necessary steps to produce the dynamic filtering that results in lowered noise and improved stability.

The memory element 105 is used to store the dynamic stability factor for each sensor component along with other parameters and partial results used in the computations. The processing element 104 is responsible for storing and retrieving the sensor readings and computed values from the memory element 105 according to the method described below. In addition, memory element 105 may contain various software modules executed by processing element 104 to perform actions of the system (e.g., filtering, data fusion, output generation, etc.) and the data method described below.

A system that uses magnetometers may typically output the sensor data itself, often after calibration steps are applied, or may output the results of computations using the sensor data as an input. For each type of system, the inputs are similar but the utilization of the sensor data or the produced output may be different. For instance, (a) Inertial Measurement Units (IMU) generally read the data from the sensor components and output the resulting sensor data in real-time. However, the IMU may also perform calibration steps upon the sensor data.

(b) Attitude and Heading Reference Systems (AHRS) read the same data from the sensor components, but generally perform both calibration and computational steps on-board to convert the sensor data from multiple independent sensor data values into useful navigation outputs such as attitude (pitch & roll) and heading (yaw). Outputs are generally produced in real-time to allow use for navigation.

(c) Compassing Systems are more limited versions of the AHRS and generally perform similar computations, but often have fewer sensor elements and more restricted usage domains that simply require an azimuth (yaw) or magnetic vector output. Outputs are generally produced in real-time to allow use for navigation.

(d) Inertial Navigation Systems (INS) read the same data from the sensor components, but perform both calibration and computational steps on-board to convert the sensor data from multiple independent sensor data values into useful navigation outputs such as attitude (pitch & roll) and heading (yaw). These navigational outputs are then fused with other sensing system outputs such as GPS, air-speed, wind-speed, land-speed, ground telemetry, etc. to produce accurate navigation data outputs.

Each type of system described above utilizes the output of the individual sensor elements. These sensor elements are, by their nature, imperfect and subject to noise, as well as other instabilities. The noise that is present in the sensor output comes from multiple sources which may be generally categorized as measurement noise, process noise, and environmental noise. Thus, the output of the sensing element will be the measured signal plus the error introduced for all of the noise sources. It is often very difficult or impossible to differentiate the true signal from the noise since the noise sources can be difficult to differentiate and can frequently change over time and circumstances.

In a system that utilizes inertial sensors, the accumulated noise that is present in the sensor signals can result in errors in the filtered output. Since the noise-induced errors are unpredictable and change under different conditions, there is no way to account for and subsequently correct the noise-induced errors and, as a result, the output of the system will contain or be affected by some amount of noise.

While the noise may be reduced by employing techniques such as over-sampling, low-pass filtering, running averages, as well as other data smoothing and filtering methods, use of these techniques will generally produce a trade-off in responsiveness versus noise reduction. By using a running average, for example, individual data items which include noise will less likely affect the overall signal since the noise will have a reduced individual impact due to averaging multiple samples over time. However, in this case, a true change in the actual signal during motion will now take time to be fully realized since the signal takes time to propagate through the samples of the running average. The same issue occurs with other noise reduction techniques, thus a system designer is left with making a choice between responsiveness and noise-free output.

The present invention embodiment described below dynamically adjusts pre-sensor-fusion filters so that the end result is an inertial sensing system that is both stable under static conditions and responsive under dynamic conditions. More importantly, the present invention embodiment described below does the adjusting in a manner that is independent of the sensor fusion method used and is highly computationally efficient.

Figure 2:
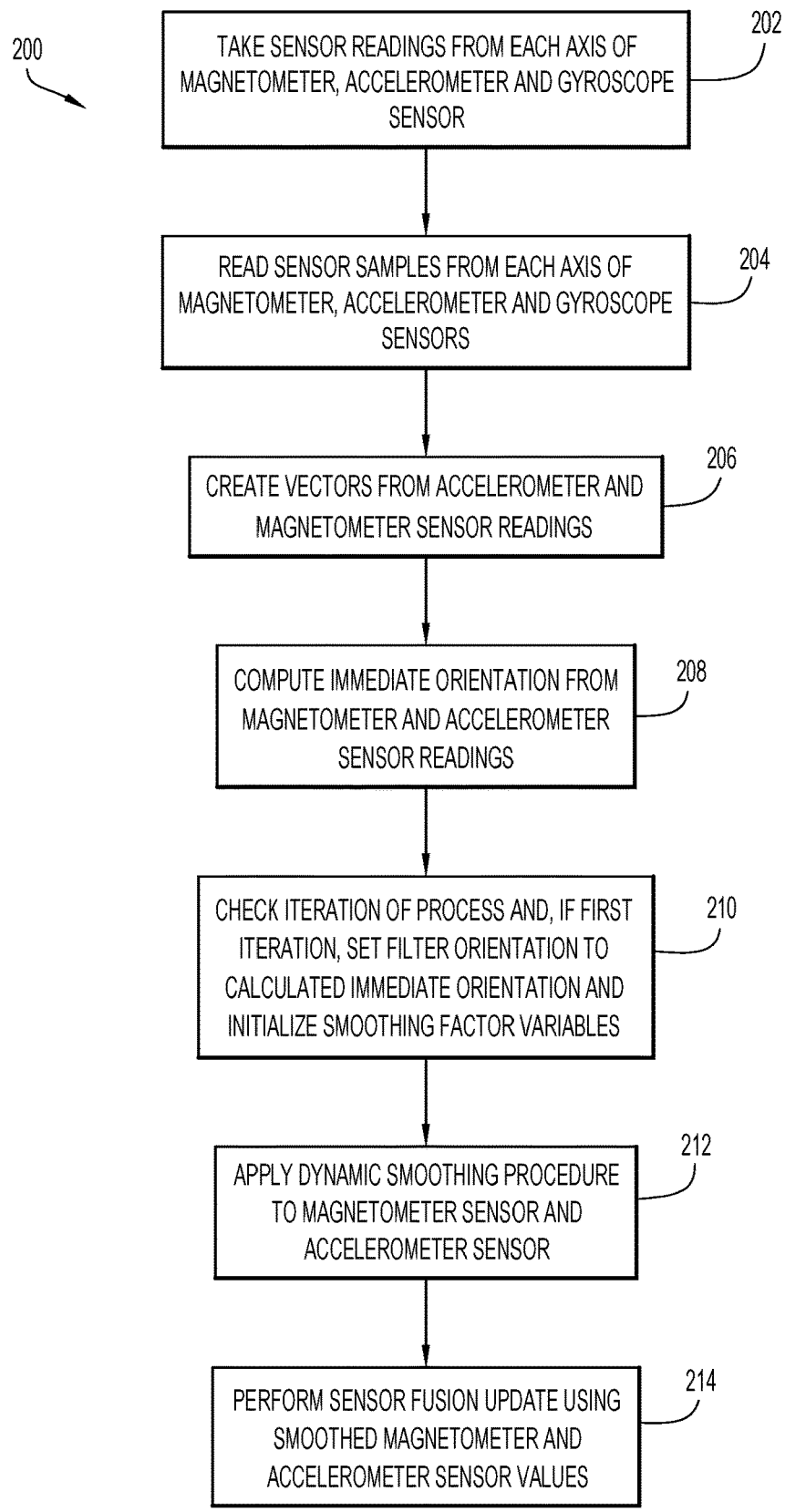
FIG. 2 is a flowchart depicting an example process to improve noise and stability performance of an inertial sensing system according to an embodiment of the present invention.

Referring to FIG. 2, the method (process) 200 of the present invention embodiment begins at step 202 by taking sensor readings from each axis of the component sensors listed below:

Magnetometer: MX, MY, MZ
Gyroscope: GX, GY, GZ
Accelerometer: AX, AY, AZ

After sensor readings have been taken, the process continues as follows:

1. Read sensor samples from each sensor axis: GX, GY, GZ, MX, MY, MZ, AX, AY, AZ (step 204).

2. Create a vector from the accelerometer sensor readings and a vector from the magnetometer sensor readings (step 206):

$$\text{ACC\_VEC} = \text{vec3}(AX, AY, AZ)$$

$$\text{MAG\_VEC} = \text{vec3}(MX, MY, MZ)$$

3. Compute the immediate orientation from the magnetometer and the accelerometer (step 208). This can be accomplished in several ways. For instance, the following method (process) may be employed:

3.1 Normalize the accelerometer vector and the magnetometer vector:

$$\text{MAG\_NORM} = \text{vec3\_normalize}(\text{MAG\_VEC})$$

$$\text{ACC\_NORM} = \text{vec3\_normalize}(\text{ACC\_VEC})$$

3.2 Compute the dot-product of the two normalized vectors:

VEC_DOT=MAG_NORM·ACC_NORM 3.3 Compute a temporary vector as:

TEMP_VEC=vec3_normalize(MAG_NORM−ACC_NORM*VEC_DOT)

3.4 Create reference vectors for the magnetometer and the accelerometer:

ACC_REF=vector3(0,0,1)

MAG_REF=vector3(1,0,0)

3.5 Compute the dot-product of the two reference vectors:

REF_DOT=MAG_REF·ACC_REF 3.6 Compute a temporary reference vector as:

TEMP_REF=vec3_normalize(MAG_REF−ACC_REF*REF_DOT)

3.7 Compute the cross product of the normalized accelerometer vector and TEMP_VEC:

F_CROSS=ACC_NORM×TEMP_VEC 3.8 Create a 3×3 matrix as follows:

$$READ\_MAT = \begin{bmatrix} ACCNORM_X & TEMPVEC_X & FCROSS_X \\ ACCNORM_Y & TEMPVEC_Y & FCROSS_Y \\ ACCNORM_Z & TEMPVEC_Z & FCROSS_Z \end{bmatrix}$$

3.9 Compute the cross product of the normalized accelerometer reference and TEMP_REF:

F_CROSS2=ACC_REF×TEMP_REF 3.10 Create a 3×3 matrix as follows:

$$OUT\_MAT = \begin{bmatrix} ACCREF_X & TEMPREF_X & FCROSS2_X \\ ACCREF_Y & TEMPREF_Y & FCROSS2_Y \\ ACCREF_Z & TEMPREF_Z & FCROSS2_Z \end{bmatrix}$$

3.11 Compute the matrix inverse of OUT_MAT:

OUT_MAT_INV=mat3x3_inverse(OUT_MAT)

3.12 Compute the final output matrix:

OUT_MAT_FINAL=OUT_MAT_INV*READ_MAT 3.13 Convert the rotation matrix (final output matrix) to a quaternion:

OUT_QUAT=rot_matrix_to_quat(OUT_MAT_FINAL)

3.14 Conjugate the output quaternion:

OUT_QUAT=quat_conjugate(OUT_QUAT)

3.15 Compute and return the immediate orientation as the normalized OUT_QUAT:

IMM_QUAT=vec4_normalize(OUT_QUAT)

return IMM_QUAT

4. Check to determine if this is the first iteration of the process (step 210).

If it is the first iteration, perform the following initialization:

Set the filter orientation to the immediate orientation as computed in 3 and initialize the following process variables:

SMOOTH_FACTOR=1.0 (The current smooth factor.)

SMOOTH_MAX=0.999 (The maximum smooth factor to be applied.)

SMOOTH_MIN=0.4 (The minimum smooth factor to be applied.)

SMOOTH_MAGNIFICATION=100.0 (The magnification factor to be applied.)

SMOOTH_FACTOR_OFFSET=0.0 (The smooth factor offset to be applied.)

MAG_VEC_SMOOTH=MAG_VEC (The initial smoothed magnetometer vector.)

ACC_VEC_SMOOTH=ACC_VEC (The initial smoothed accelerometer vector.)

5. Apply the dynamic smoothing procedure (step 212) as follows:

5.1 Compute the immediate orientation using the procedure set forth in 3.

5.2 Retrieve the sensor-fusion output orientation quaternion (filter quaternion). This quaternion could be produced by any sensor-fusion method such as a kalman filter, complimentary filter, direct cosine matrix filter, or any other inertial sensor fusion filter.

5.3 Compute the dot product of the immediate quaternion (IMM_QUAT) and the filter quaternion (FILTER_QUAT):

QUAT_DOT=IMM_QUAT·FILTER_QUAT 5.4 Magnify the dot-product to produce the dynamic smoothing value:

DSMOOTH_VALUE=1−(1−abs(QUAT_DOT))*SMOOTH_MAGNIFICATION 5.5 Ensure that negative values cannot be produced by the magnification:

if DSMOOTH_VALUE<0:

DSMOOTH_VALUE=0

5.6 Use the dynamic smoothing factor to interpolate between the minimum and maximum factors:

SMOOTH_FACTOR=SMOOTH_MIN+DSMOOTH_VALUE*(SMOOTH_MAX−SMOOTH_MIN)

5.7 Apply the smooth factor offset (if necessary):

SMOOTH_FACTOR=SMOOTH_FACTOR+SMOOTH_FACTOR_OFFSET 5.8 Compute the smoothed sensor values for the magnetometer and the accelerometer, where MX_SMOOTHED, MY_SMOOTHED and MZ_SMOOTHED indicate corresponding components of MAG_VEC_SMOOTH; and AX_SMOOTHED, AY_SMOOTHED and AZ_SMOOTHED indicate corresponding components of ACC_VEC_SMOOTH:

MX_SMOOTHED=MX_SMOOTHED*SMOOTH_FACTOR+MX*(1.0−SMOOTH_FACTOR)

MY_SMOOTHED=MY_SMOOTHED*SMOOTH_FACTOR+MY*(1.0−SMOOTH_FACTOR)

$MZ\_SMOOTHED=MZ\_SMOOTHED*SMOOTH\_FACTOR+MZ*(1.0-SMOOTH\_FACTOR)$ $AX\_SMOOTHED=AX\_SMOOTHED*SMOOTH\_FACTOR+AX*(1.0-SMOOTH\_FACTOR)$ $AY\_SMOOTHED=AY\_SMOOTHED*SMOOTH\_FACTOR+AY*(1.0-SMOOTH\_FACTOR)$ $AZ\_SMOOTHED=AZ\_SMOOTHED*SMOOTH\_FACTOR+AZ*(1.0-SMOOTH\_FACTOR)$ 5.9 Replace the magnetometer and accelerometer sensor values with the smoothed values:

$MX=MX\_SMOOTHED$ $MY=MY\_SMOOTHED$ $MZ=MZ\_SMOOTHED$ $AX=AX\_SMOOTHED$ $AY=AY\_SMOOTHED$ $AZ=AZ\_SMOOTHED$

6. Perform Sensor Fusion Update (step 214)

In this step, any sensor fusion method can be used. The dynamic smoothing procedure will cause the output to exhibit low-noise output while maintaining responsiveness during dynamic conditions.

Moreover, the above described method (process) can be implemented to better support certain use-cases or problem domains by modifying the implementation in subtle ways. A partial list of such modified implementations is noted below.

1. Tune the parameters that govern the smoothing process.

For sensors with a particular set of operating characteristics and applications using different sensor fusion implementations or requiring varying orientation output characteristics, it can be beneficial to tune the dynamic smoothing parameters. The following is a list of the tunable parameters:

SMOOTH_MAX (The maximum smooth factor to be applied.)

SMOOTH_MIN (The minimum smooth factor to be applied.)

SMOOTH_MAGNIFICATION (The magnification factor to be applied.)

SMOOTH_FACTOR_OFFSET (The smooth factor offset to be applied.)

These parameters can also be dynamically auto-tuned based upon the operating characteristics of the system.

2. Use separate smoothing parameters for magnetometer and accelerometer sensors.

It may be desirable at times to use separate dynamic smoothing parameters for each of the sensor input types. This would be the case if the sensors have different characteristic levels of noise present in their output signals. For example, a sensor system may have a magnetometer 101 that has higher noise than an accelerometer 103 and, therefore, requires additional smoothing levels to provide best results. To achieve this, it is possible to have a separate set of parameters and variables for each sensor type and have these parameters and variables applied to each sensor type respectively.

3. Use non-linear application of the smoothing factor.

The produced smooth factor can be applied in a non-linear manner for the interpolation between SMOOTH_MIN and SMOOTH_MAX. By using a non-linear mapping, such as sigmoid-curve, exponential-curve or other non-linear curve, some applications may benefit.

4. Use the computed smooth factor for other purposes.

The computed dynamic smooth factor can also be used for other purposes, such as determine when the sensor is at rest or in motion, auto-calibrate the gyroscope sensors or modulate sensor fusion parameters, e.g., sensor component trust values, beta-values or control coefficients.

5. Use of the computed smooth factor in a mixing function.

The computed dynamic smooth factor can also be mixed with other data items, such as (a) the variance of individual sensor outputs; (b) the variance of the length of the accelerometer vector; (c) the error of the length of the accelerometer vector; (d) the variance of the length of the magnetometer vector; (e) the error of the length of the magnetometer vector; (f) the sum of gyro output components; (g) the variance of the angle between the accelerometer vector and the magnetometer vector; and (h) the error in the angle between the accelerometer vector and the magnetometer vector.

6. Use of the smoothed orientation to produce synthesized virtual sensor outputs.

By using the sensor-fused orientation output (which is now noise-free and responsive), virtual sensor values can be reconstructed for the magnetometer 101, gyroscope 102 and accelerometer 103. These virtual outputs can function as a superior set of sensor values for an IMU purpose where a lower-noise yet responsive output is desired. The mixing function can then be used to produce a multi-input smoothing factor.

To summarize, a present invention embodiment is directed to a system that dynamically adapts to the changing state of the inertial system in such a way that the system remains ultra-responsive during dynamic events while also exhibiting ultra stable output during subtle motions or rest conditions. The method identified in the present invention embodiment operates upon the data as it exits the component sensors and before it enters the sensor fusion that produces a final orientation. The identified method can be used with any sensor fusion algorithm and provides for improved noise and stability performance in the output while having little to no impact upon responsiveness of that output during dynamic conditions.

In addition, a system of the present invention embodiment may include any number of processing devices (e.g., processor, controller, etc.), and may include any combination of hardware and/or software to perform the functions described above. These devices may include any types of displays and input devices (e.g., virtual or physical keyboard, mouse, voice recognition, touch screen, etc.) to enter and/or view information.

It is to be understood that software of the present invention embodiment may be implemented in any desired computer language and could be developed by one of ordinary skill in the computer arts based on the functional descriptions contained in the specification and flow diagrams illustrated in the drawings. Further, any references herein of software performing various functions generally refer to computer systems or processors performing those functions under software control. The processor of the present invention embodiment may alternatively be implemented by any type of hardware and/or other processing circuitry.

Moreover, the various functions of the processing devices may be distributed in any manner among any number of software and/or hardware modules or units and/or circuitry, where the processing devices may be disposed locally or remotely of each other and communicate via any suitable communications medium (e.g., LAN, WAN, Intranet, Internet, hardwire, modem connection, wireless, etc.). For example, the functions of the present invention embodiment may be distributed in any manner among the processor and/or any other intermediary processing devices. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The processing devices of the present invention embodiment may include any conventional or other communications devices to communicate via any conventional or other protocols. The processing systems or devices may utilize any type of connection (e.g., wired, wireless, etc.).

Further, the present invention embodiment may employ any number of any type of user interface (e.g., Graphical User Interface (GUI), etc.). The interface may provide a virtual reality environment, and/or be used for obtaining or providing information, where the interface may include any information arranged in any fashion. The interface may include any number of any types of objects and/or input or actuation mechanisms (e.g., buttons, icons, fields, boxes, links, etc.) disposed at any locations to enter/display information and initiate desired actions via any suitable input devices (e.g., mouse, virtual or physical keyboard, touch screen, etc.).

Aspects of present invention embodiments may be reflected by, but not limited to, the following claims.

The invention claimed is:

1. An inertial sensing system comprising:
a plurality of sensors;
a processing element coupled to the plurality of sensors; and
a memory element coupled to the processing element, wherein the processing element is operable to:
evaluate output measurement data from at least two of the sensors and compute an initial orientation;
apply a smoothing factor to the output measurement data to produce smoothed output measurement data for the at least two sensors, wherein the smoothing factor is derived from a dynamic smoothing value that dynamically adjusts based on changing output measurement data from the at least two sensors, and wherein applying the smoothing factor further comprises:
determining the dynamic smoothing value based on application of a filter quaternion to a quaternion of the initial orientation, wherein the filter quaternion is produced by a prior sensor fusion of a sensor fusion filter;
interpolating between minimum and maximum values for the smoothing factor using the dynamic smoothing value to produce an interpolated value; and
determining the smoothing factor based on the interpolated value; and perform sensor fusion by the sensor fusion filter with the smoothed output measurement data to produce a resulting orientation from the inertial sensing system.

2. The inertial sensing system of claim 1, wherein the plurality of sensors includes two or more from a group of:
a magnetometer sensor configured to sense magnitude and direction of Earth's magnetic field and provide output measurement data indicating the magnitude and direction of the sensed magnetic field in 3-space;
a gyroscope sensor configured to sense a rate of change of angular velocity over time and provide output measurement data representing the rate of change in 3-space; and
an accelerometer sensor configured to sense acceleration forces applied to the inertial sensing system and provide output measurement data representing direction and magnitude of the sensed acceleration forces in 3-space.

3. The inertial sensing system of claim 2, wherein the processing element is further operable to perform one or more from a group of:
determine a state of a sensor in one of rest and motion based on the dynamic smoothing value;
calibrate the gyroscope sensor based on the dynamic smoothing value; and
modulate sensor fusion parameters based on the dynamic smoothing value.

4. The inertial sensing system of claim 2, wherein the processing element is further operable to:
mix the dynamic smoothing value with one or more data items from a group of: a variance of individual sensor outputs; a variance of a length of a vector from the accelerometer sensor; an error of the length of the vector from the accelerometer sensor; a variance of a length of a vector from the magnetometer sensor; an error of the length of the vector from the magnetometer sensor; a sum of output components from the gyroscope sensor; a variance of an angle between vectors from the accelerometer sensor and magnetometer sensor; and an error in the angle between vectors from the accelerometer sensor and magnetometer sensor.

5. The inertial sensing system of claim 1, wherein the smoothing factor is further derived based on one or more from a group of: a magnification factor and a smoothing factor offset.

6. The inertial sensing system of claim 5, wherein the processing element is further operable to dynamically tune parameters for deriving the smoothing factor based on operating characteristics of the inertial sensing system.

7. The inertial sensing system of claim 1, wherein two or more sensors are associated with different sets of parameters to derive different associated smoothing factors for those sensors, and wherein applying the smoothing factor further comprises:
applying the associated smoothing factors to the corresponding sensors to produce the smoothed output measurement data for the corresponding sensors.

8. The inertial sensing system of claim 1, wherein interpolating between minimum and maximum values for the smoothing factor further comprises:
applying the dynamic smoothing value in a non-linear manner to interpolate between the minimum and maximum values for the smoothing factor to produce the interpolated value.

9. The inertial sensing system of claim 1, wherein the processing element is further operable to:

process the resulting orientation from the sensor fusion to derive virtual output measurement data from the plurality of sensors; and utilize the virtual output measurement data for the plurality of sensors to perform inertial sensing system operations.

10. A method of producing measurements in an inertial sensing system including a plurality of sensors and a processing element coupled to the plurality of sensors, the method comprising:

generating output measurement data by the plurality of sensors;

evaluating, via the processing element, the output measurement data from at least two of the sensors and computing an initial orientation;

applying, via the processing element, a smoothing factor to the output measurement data to produce smoothed output measurement data for the at least two sensors, wherein the smoothing factor is derived from a dynamic smoothing value that dynamically adjusts based on changing output measurement data from the at least two sensors, and wherein applying the smoothing factor further comprises:

determining the dynamic smoothing value based on application of a filter quaternion to a quaternion of the initial orientation, wherein the filter quaternion is produced by a prior sensor fusion of a sensor fusion filter;

interpolating between minimum and maximum values for the smoothing factor using the dynamic smoothing value to produce an interpolated value; and determining the smoothing factor based on the interpolated value; and performing, via the processing element, sensor fusion by the sensor fusion filter with the smoothed output measurement data to produce a resulting orientation from the inertial sensing system.

11. The method of claim 10, wherein the plurality of sensors includes two or more from a group of:

a magnetometer sensor configured to sense magnitude and direction of Earth's magnetic field and provide output measurement data indicating the magnitude and direction of the sensed magnetic field in 3-space;

a gyroscope sensor configured to sense a rate of change of angular velocity over time and provide output measurement data representing the rate of change in 3-space; and an accelerometer sensor configured to sense acceleration forces applied to the inertial sensing system and provide output measurement data representing direction and magnitude of the sensed acceleration forces in 3-space.

12. The method of claim 11, further comprising one or more from a group of:

determining a state of a sensor in one of rest and motion based on the dynamic smoothing value;

calibrating the gyroscope sensor based on the dynamic smoothing value; and modulating sensor fusion parameters based on the dynamic smoothing value.

13. The method of claim 11, further comprising:

mixing the dynamic smoothing value with one or more data items from a group of: a variance of individual sensor outputs; a variance of a length of a vector from the accelerometer sensor; an error of the length of the vector from the accelerometer sensor; a variance of a length of a vector from the magnetometer sensor; an error of the length of the vector from the magnetometer sensor; a sum of output components from the gyroscope sensor; a variance of an angle between vectors from the accelerometer sensor and magnetometer sensor; and an error in the angle between vectors from the accelerometer sensor and magnetometer sensor.

14. The method of claim 10, wherein the smoothing factor is further derived based on one or more from a group of: a magnification factor and a smoothing factor offset.

15. The method of claim 14, further comprising:

dynamically tuning parameters for deriving the smoothing factor based on operating characteristics of the inertial sensing system.

16. The method of claim 10, wherein two or more sensors are associated with different sets of parameters to derive different associated smoothing factors for those sensors, and wherein applying the smoothing factor further comprises:

applying the associated smoothing factors to the corresponding sensors to produce the smoothed output measurement data for the corresponding sensors.

17. The method of claim 10, wherein interpolating between minimum and maximum values for the smoothing factor further comprises:

applying the dynamic smoothing value in a non-linear manner to interpolate between the minimum and maximum values for the smoothing factor to produce the interpolated value.

18. The method of claim 10, further comprising:

processing the resulting orientation from the sensor fusion to derive virtual output measurement data from the plurality of sensors; and utilizing the virtual output measurement data for the plurality of sensors to perform inertial sensing system operations.

* * * * *